C. H. STINSON.
TRACTOR.
APPLICATION FILED APR. 12, 1916.
1,321,258.
Patented Nov. 11, 1919.
3 SHEETS—SHEET 3.
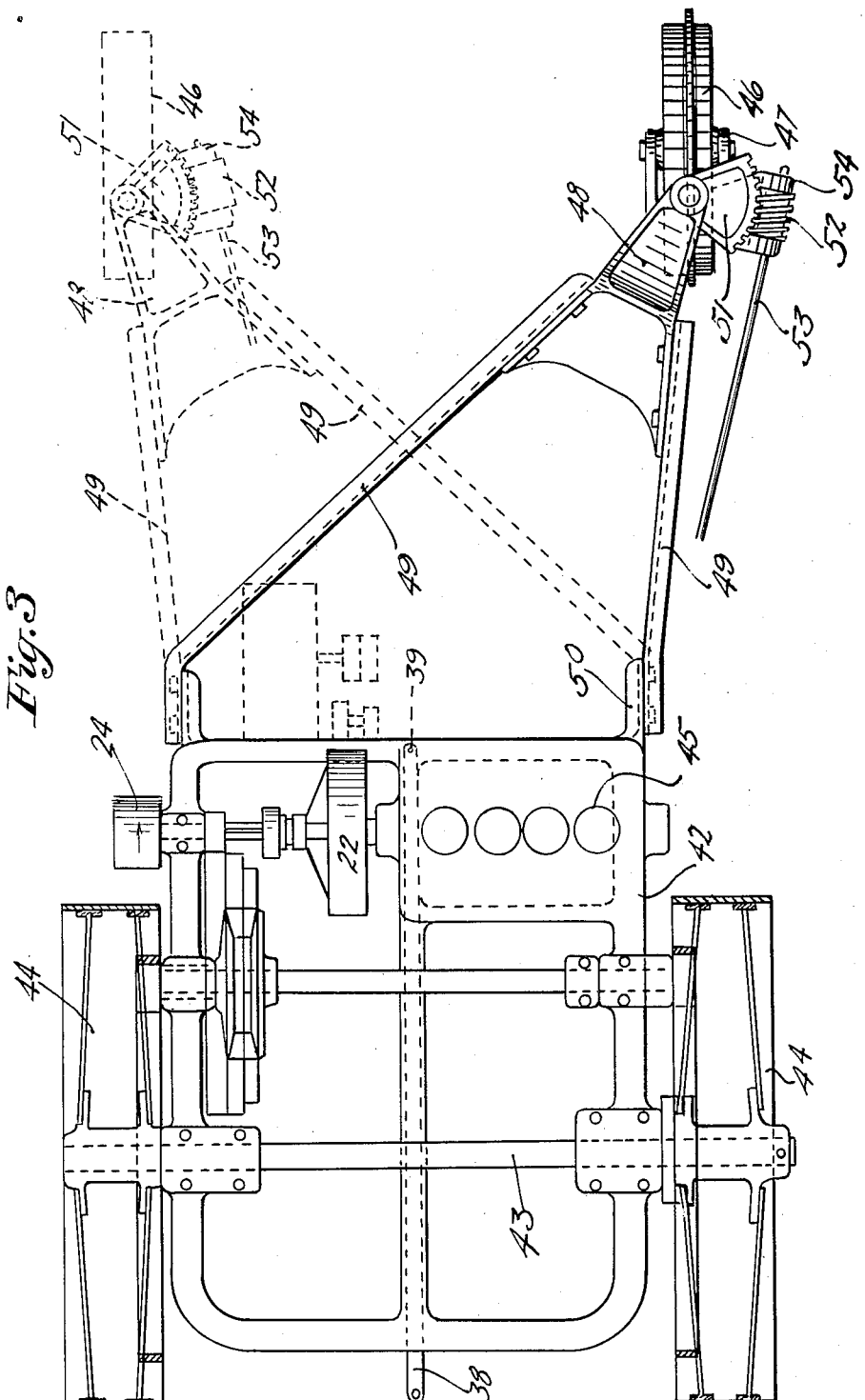
Witnesses
E. C. Wells
3 G Wheeler
Inventor
Charles H. Stinson
By his Attorneys
Williamson Merchant

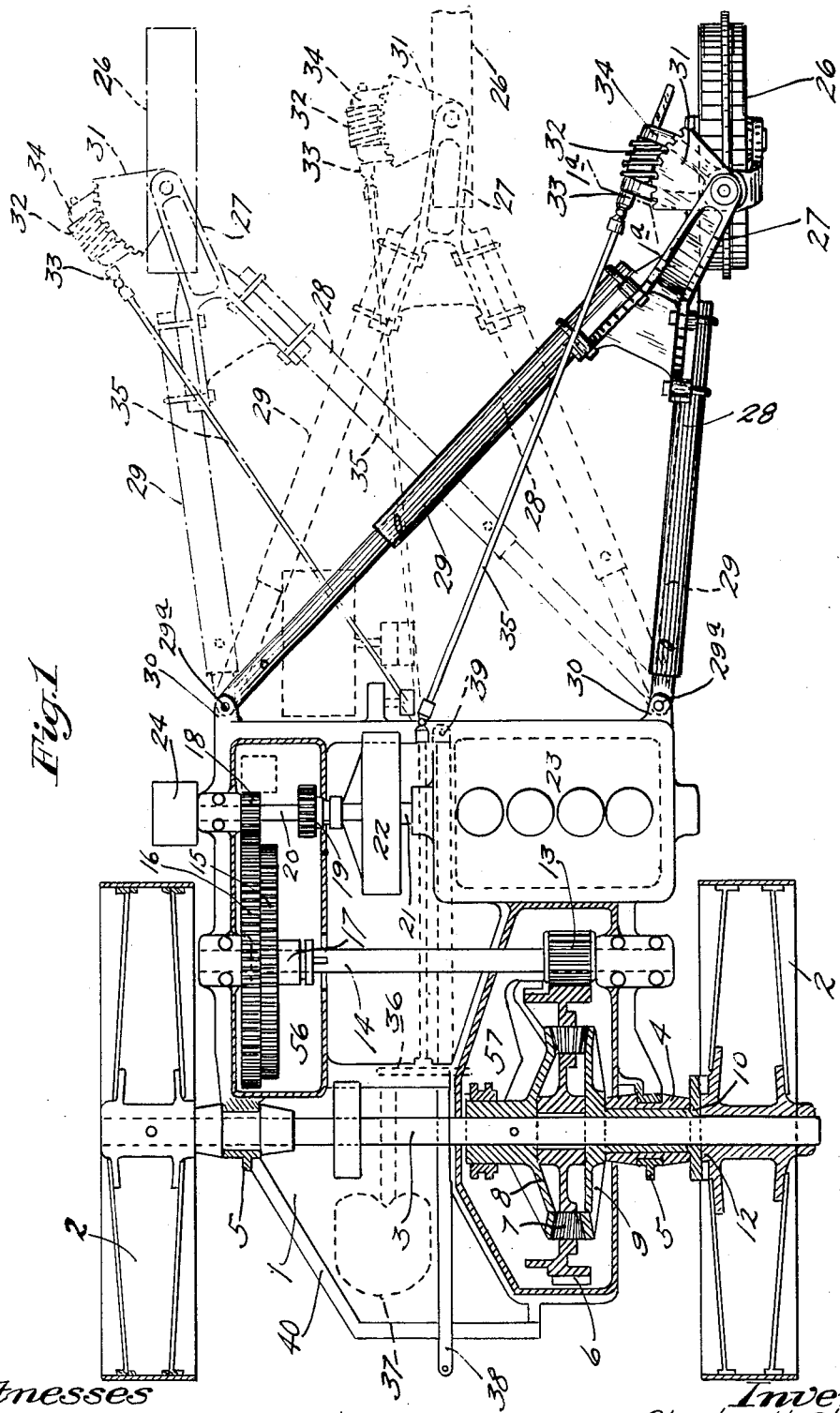
C. H. STINSON.
TRACTOR.
APPLICATION FILED APR. 12, 1916.
1,321,258.
Patented Nov. 11, 1919.
3 SHEETS—SHEET 1.
Witnesses
E. C. Wells
B. G. Wheeler
Inventor
Charles H. Stinson
By his Attorneys
Williamson Merchant

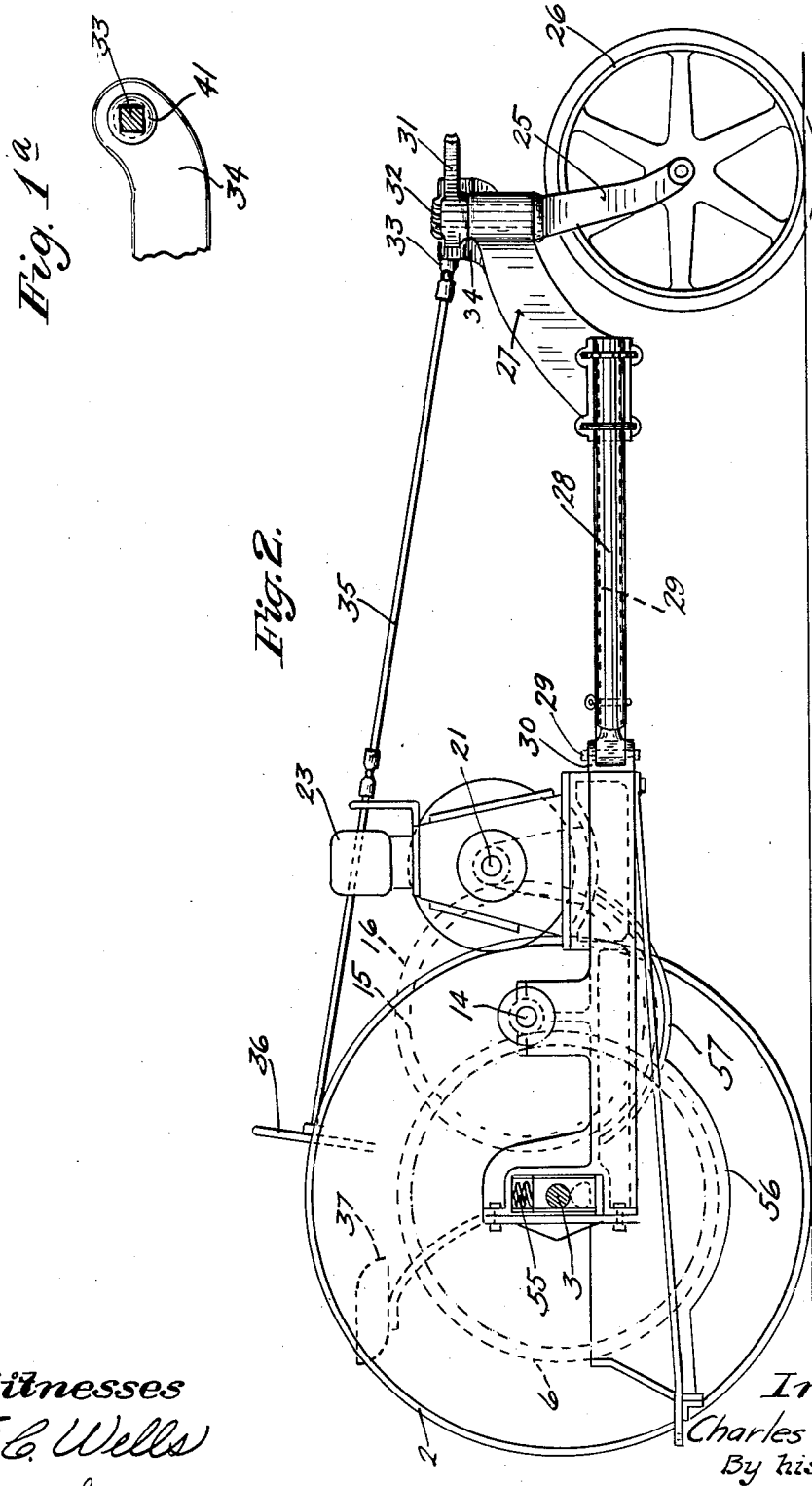

UNITED STATES PATENT OFFICE.

CHARLES H. STINSON, OF WATERTOWN, SOUTH DAKOTA.

TRACTOR.

1,321,258. Specification of Letters Patent. Patented Nov. 11, 1919.

Application filed April 12, 1916. Serial No. 90,583.

*To all whom it may concern:*

Be it known that I, CHARLES H. STINSON, a citizen of the United States, residing at Watertown, in the county of Codington and State of South Dakota, have invented certain new and useful Improvements in Tractors; and I do hereby declare the following to be a full, clear, and exact description of the invention, such as will enable others skilled in the art to which it appertains to make and use the same.

My invention has for its object to provide an improved tractor wherein the front or steering wheel may be shifted from one side to the other of the tractor into approximate alinement with either of the two traction wheels, thereby transforming the machine from a right to a left hand machine, or vice versa, as required when a tractor is to be used, sometimes with right hand plows and sometimes with left hand plows. The invention also involves certain other features, as will hereinafter appear.

Generally stated, the invention consists of the novel devices and combinations of devices hereinafter described and defined in the claims.

In the accompanying drawings which illustrate the invention, like characters indicate like parts throughout the several views. Referring to the drawings:

Figure 1 is a view chiefly in plan but with some parts sectioned showing the improved tractor in its preferred form;

Fig. 1ª is a fragmentary section on the line 1ª—1ª of Fig. 1;

Fig. 2 is a side elevation of the same; and

Fig. 3 is a view corresponding to Fig. 1, but illustrating a modified construction.

Referring first to the construction illustrated in Figs. 1 and 2, the numeral 1 indicates the main frame, preferably a casting, the numeral 2 the rear or traction wheels, and the numeral 3 the rear axle. This rear axle 3 is directly journaled in bearings 4 that are supported by brackets 5 of the main frame 1. The said axle, it will be noted, is continuous and is extended through the hubs of both traction wheels so that it will properly carry the load. The two traction wheels, however, are driven through a differential gear mechanism, and hence, only one of the traction wheels is secured for rotation with the said axle. As shown, the left hand traction wheel is thus bent or carried to the said axle, and the other traction wheel is loose thereon.

The differential gear mechanism employed is preferably substantially of the type disclosed and claimed in my pending application S. N. 82,105, filed of date, March 4th, 1916, and entitled "Differential gear and clutch mechanism."

Of the parts thereof, the numeral 6 indicates a master gear that is journaled on the axle 3 and carries radially disposed beveled pinions 7 that engage with two opposing beveled gears 8 and 9. The gear 8 is keyed, or otherwise secured to the axle 3 for rotation therewith, while the gear 9 is provided with a long sleeve-like hub 10 journaled in the right hand bearing 4 for direct engagement with the axle 3, and having at its outer end a half clutch or bifurcated head that engages a half clutch 12 on the hub of the right hand traction wheel.

The master gear 6 engages a spur pinion 13 on a counter shaft 14 journaled in suitable bearings on the main frame 1 and provided at its left hand end with gears 15 and 16 secured to a common hub 17 carried by the counter shaft 14 for sliding movements thereon, so that the said gears 15 and 16 may be slid, respectively, into mesh with pinions 18 and 19 of another counter shaft 20 that is also journaled in suitable bearings on the frame 1.

This counter shaft 20 is adapted to be connected, at will, to the engine crank shaft 21 by a friction clutch 22 of well known, or any suitable construction. The motor for driving the tractor is preferably a multi-cylinder explosive engine indicated at 23 and suitably carried on the main frame 1. At its outer end, the shaft 20 is shown as provided with a pulley 24 adapting the tractor to be used as a stationary power plant, when the gears 15 and 16 are slid into an intermediate position, out of mesh with both of the pinions 18 and 19.

The weight of the front portion of the tractor is carried on a wheel-equipped steering bracket or fork, which, as shown, is provided with a single wheel which may have one or more ground engaging wheels, only one of which would, at any one time, be used as a steering wheel arranged to run in the furrow. As shown, this wheel bracket or fork 25 has a single furrow engaging guide wheel 26 and its upright spindle is journaled in the front end of a head casting 27 having a flaring rear end portion, which, as shown in Figs. 1 and 2, is flanged to fit the front ends of rearwardly diverging bars or pipe sections 28. Into these pipe sections 28 are telescoped similar bars or pipe sections 29, the rear ends of which are provided with hinge lugs 29ª that are pivoted to hinge lugs 30 on the opposite sides of the front end of the main frame 1. The pivotal connections between the lugs 29ª and 30 should be very strong and should have sufficient vertical extension to enable them to carry the load which is thrown upon the said pivots.

By means of set screws or other suitable devices, these telescoped pipe sections may be locked in any of the several adjustments indicated by full and dotted lines in Fig. 1, or for that matter, in any intermediate position. In Fig. 1, the full lines, as is obvious, show the machine adjusted for right hand plows, while the broken dotted lines at the left show the same adjusted for left hand plows. The intermediate position indicated by dotted lines shows the steering wheel in a central position, as best adapted for road travel, or for any other field work than plowing, under ordinary conditions. Sometimes, however, even road travel may make it advisable to adjust the steering wheel to the one side or the other.

The spindle of the wheel bracket 25 is provided with a rigidly secured worm gear sector 31 carried by a short shaft 33 journaled in prongs 34 of the bearing head 27. The said prongs 34 hold the worm gear 32 against endwise movements. The worm shaft 33 is connected to the front end of a flexible or jointed operating shaft 35, the rear section of which is mounted in suitable bearings on the frame 1 and terminated in a hand wheel 36 located within reach of the operator's seat 37.

The numeral 38 indicates a draw bar shown as extended under the main frame 1, pivotally connected at its front end to the front portion of said frame, as at 39 and loosely resting, at its rear end, on a horizontal supporting strap 40 carried by the rear portion of the frame 1.

The manner in which the steering wheel may be adjusted transversely of the tractor by telescopic adjustments of the extensible bars 28 and 29, has already been made clear, but under such adjustments, it is obvious that the distance between the worm 32 and the front end of the rear section of the jointed shaft 35 will vary somewhat. To take care of this variation, the shaft 33 is preferably made a square shaft (see Fig 1ª) engaging the correspondingly formed axial seat in the worm 32 and in hubs 41 rotatively mounted in the prongs 34, but held against endwise movements of the said shaft.

Furthermore, the said shaft 33 is made long enough to take care of the above variations by sliding movements through the worm 32 and rotary hubs 41. The means for imparting the oscillatory steering movements to the steering wheel 36 will, therefore, automatically adapt themselves to the different lateral adjustment of the said steering wheel, and by manipulation of the handle wheel 36, the steering wheel may be always properly set and properly manipulated.

In the modified construction illustrated in Fig. 3, it is, for the purposes of this case, only desirable to particularly note the main frame 42, rear axle 43, rear traction wheels 44 and an engine 45, which latter is connected to the traction wheels through transmission mechanism, not necessarily here considered.

The front steering wheel 46, like the wheel 26, is journaled in a forked wheel bracket 47, the spindle of which is swiveled to a head bearing 48, which, like the bearing 27, is provided with rearwardly diverging rear end portions, but in this instance, bolted or otherwise detachably secured to relatively long and short rearwardly diverging commercial steel bars 49. The rear ends of these bars 49 are rigidly, but detachably bolted to heavy lugs 50 on the sides of the front portion of the main frame 1. These relatively long and short bars 49 are interchangeable from side to side, so that the steering wheel may be set either at the right, as shown by full lines, or at the left, as indicated by dotted lines in Fig. 3. It may be further noted that the spindle of the wheel bracket 47 has a rigidly secured worm gear sector 51 that engages the worm 52 of a shaft 53 journaled in lugs or arms 54 of the bearing head 48, and operating substantially as in the form of the tractor illustrated in Figs. 1 and 2.

It is very desirable that the truck frame be spring-supported from the rear axle and this is accomplished by mounting the bearings 4 for vertical movements in the brackets 5 of the main frame 1, and by interposing springs 55 between the tops of the said bearings and the overlying upper portions of said brackets, as shown in Fig. 2. This very greatly relieves the tractor from strains and reduces the wear thereon, and also, of course, makes the tractor easier riding.

All of the gears are arranged to run in oil contained in gear casings 56 and 57 that are formed integral therewith, or, otherwise, rigidly secured to the main frame 1, as shown in Fig. 1. In Fig. 2, the various gears are diagrammatically shown by dotted lines.

The form of the tractor illustrated in Fig. 3 is somewhat more simple than that illustrated in Figs. 1 and 2, but the steering wheel is not capable of as many adjustments as the preferred form.

The tractor above described may, of course, be made in various different sizes, but is especially designed for use as a small tractor capable of drawing two or three plows and which may be made at low cost and operated by one person, both when plowing and when used for other work.

What I claim is:

1. A tractor comprising laterally spaced main load carrying wheels, a truck frame mounted thereon, and a wheel-equipped steering bracket supporting a longitudinally extended portion of said truck frame and mounted for adjustments transversely thereof, to set the same in different transverse adjustments in respect to the line of travel of said main wheels, and means for oscillating said wheel-equipped bracket horizontally to control the travel of the tractor, said means being adjustable to different lateral adjustments of said supporting bracket.

2. A tractor having rear wheels, a truck frame mounted thereon and projecting forward thereof, and a wheel-equipped steering bracket supporting the front end of said truck frame, mounted for adjustments transversely thereof, to set the same in different transverse adjustments in respect to the line of travel of said rear wheels, and means for oscillating said wheel-equipped bracket horizontally to control the travel of the tractor, said means being adjustable to different lateral adjustments of said supporting bracket.

3. In a tractor, the combination with a main frame and rear traction wheels supporting the rear portion thereof, of forwardly converging bars forming part of the tractor frame, a bearing head secured to the front ends of said frame bars, and a wheel-equipped steering bracket connected to said bearing head by an upright swivel permitting oscillatory adjustments of said wheel-equipped bracket to control the travel of the tractor, the said frame bars being shiftable transversely of the tractor, to set said wheel-equipped bracket in different transverse adjustments in respect to the line of travel of the rear traction wheels.

4. In a tractor, the combination with a main frame and traction wheels supporting the same, of forwardly converging bars shiftable transversely of the tractor, a bearing head secured to the front ends of said bars, a wheel-equipped steering bracket swiveled to said bearing head, and connections for horizontally oscillating said steering bracket, self-adjusting to the different positions of said bars and to the different lateral adjustments of said wheel-equipped bracket.

5. In a tractor, the combination with a main frame and traction wheels supporting the same, of forwardly converging bars shiftable transversely of the tractor, a bearing head secured to the front ends of said bars, a wheel-equipped steering bracket swiveled to said bearing head, a main gear sector secured to the spindle of said wheel-equipped steering bracket, a worm engaging said sector and mounted in bearings carried by said bearing head, and a jointed longitudinal extensible shaft extended from said worm to the rear portion of the tractor.

6. In a tractor, the combination with a main frame and rear traction wheels supporting the same, of longitudinally extensible forwardly converging bars vertically rigid with said main frame but pivoted thereto for horizontal swinging movements, a bearing head secured to the converging front ends of said extensible bars, and a wheel-equipped steering bracket journaled to said bearing head.

7. In a tractor, the combination with a main frame and rear traction wheels supporting the same, of longitudinally extensible forwardly converging bars vertically rigid with said main frame but pivoted thereto for horizontal swinging movements, a bearing head secured to the converging front ends of said extensible bars, and a wheel-equipped steering bracket journaled to said bearing head, and connections for oscillating said steering bracket extended therefrom to the rear portion of said tractor and self-adjusting to the different positions of said bars and to the different lateral adjustments of said steering bracket.

8. In a tractor, the combination with a main frame and rear traction wheels supporting the same, of longitudinally extensible forwardly converging bars vertically rigid with said main frame but pivoted thereto for horizontal swinging movements, a bearing head secured to the converging front ends of said extensible bars, and a wheel-equipped steering bracket journaled to said bearing head a worm gear sector secured to the spindle of said steering bracket, a worm engaging the same and journaled to bearings carried by said bearing head, and a jointed longitudinally extensible shaft extended from said worm to the rear portion of said tractor and self-adjusting to the different lateral adjustments of said bars and steering bracket.

In testimony whereof I affix my signature in presence of two witnesses.

CHARLES H. STINSON.

Witnesses:
HARRY D. KILGORE,
F. D. MERCHANT.